(12) United States Patent
Scholz et al.

(10) Patent No.: US 6,956,080 B2
(45) Date of Patent: *Oct. 18, 2005

(54) ROOM TEMPERATURE CROSSLINKING, ONE COMPONENT SILICONE RUBBER FORMULATION WITH HYDROPHOBIC SILICA

(75) Inventors: Mario Scholz, Gruendau (DE); Michael Kempf, Rodenbach (DE); Christian Panz, Wesseling (DE); Kenichi Kawamoto, Hanau (DE)

(73) Assignee: Degussa AG, Duesseldorf (DE)

( * ) Notice: Subject to any disclaimer, the term of this patent is extended or adjusted under 35 U.S.C. 154(b) by 108 days.

This patent is subject to a terminal disclaimer.

(21) Appl. No.: 10/345,202

(22) Filed: Jan. 16, 2003

(65) Prior Publication Data

US 2003/0195290 A1 Oct. 16, 2003

(30) Foreign Application Priority Data

Jan. 30, 2002 (DE) .......................................... 102 03 500

(51) Int. Cl.⁷ ................................................. C08K 3/36
(52) U.S. Cl. ........................ 524/493; 524/492; 524/588
(58) Field of Search ................................ 524/588, 492, 524/493

(56) References Cited

U.S. PATENT DOCUMENTS

| | | | | |
|---|---|---|---|---|
| 4,399,267 A | * | 8/1983 | Bosch et al. .................. | 528/30 |
| 6,451,437 B1 | * | 9/2002 | Amidaiji et al. ............ | 428/447 |

FOREIGN PATENT DOCUMENTS

| | | |
|---|---|---|
| DE | 26 28 975 | 12/1977 |
| DE | 27 29 244 | 1/1979 |
| EP | 1 281 733 | 2/2003 |
| EP | 1 281 735 | 2/2003 |
| EP | 1 295 906 | 3/2003 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A room temperature crosslinking, one component (RTV 1C) silicone rubber formulation with hydrophobic, silica featuring extremely low water absorption, a high level of whiteness, and fine-tunable, storage-stable rheological properties with a high reinforcing action in the silicone rubber vulcanizate contains A) from 0.5 to 60% by weight of a hydrophobic silica having the following properties: a carbon content of >3.1%; a methanol wettability of >60%; a reflectance of >94%; a BET/CTAB ratio of from >1 to <3; a DBP absorption of <230 g/100 g; a BET surface area of from 50 to 110 m²/g; a CTAB surface area of >30 m²/g; a water vapor absorption at 30° C. at an ambient humidity of 30 of <1.3; a water vapor absorption at 30° C. at an ambient humidity of 70 of <1.7; and B) 40–99.5% by weight of an organopolysiloxane of the formula $$Z_n SiR_{3-n}\text{—}O\text{—}[SiR_2O]_x\text{—}SiR_{3-n}\text{—}Z'_n$$

wherein each R represents independently alkyl, acetoxy, oxime, alkoxy, amido, aryl or alkenyl radicals, each having from 1 to 50 carbon atoms, each unsubstituted or substituted identically or differently by O, S, F, Cl, Br or I; or R represents independently polystyrene, polyvinyl acetate, polyacrylate, polymethacrylate, or polyacrylonitrile radicals, each having 50–10 000 repeating units; wherein each Z represents independently OH, Cl, Br, acetoxy, amino, amido, amineoxy, oxime, alkoxy, alkenyloxy, acyloxy or phosphate radicals, wherein said acetoxy, amino, amido, amineoxy, oxime, alkoxy, alkenyloxy and acyloxy radicals each have up to 20 carbon atoms; wherein each Z' represents independently oxime, alkoxy, amido or acetoxy radicals; wherein n is 1–3; and wherein x is 100–15 000.

19 Claims, 3 Drawing Sheets

ROOM TEMPERATURE CROSSLINKING, ONE COMPONENT SILICONE RUBBER FORMULATION WITH HYDROPHOBIC SILICA

BACKGROUND OF THE INVENTION

1. Field of the Invention

The invention relates to a room temperature crosslinking, moisture cured, one component (RTV 1C) silicone rubber formulation with hydrophobic silica, featuring extremely low water absorption, a high level of whiteness, fine-tunable, storage-stable rheological properties and a high reinforcing action in the silicone rubber vulcanizate.

2. Discussion of the Background

The use of silicas, especially hydrophobicized precipitated silicas, in silicone rubber formulations is known and is described in, for example, DE 27 29 244 and DE 26 28 975.

DE 26 28 975 and DE 27 29 244 describe preparing hydrophobic silicas by reacting a hydrophilic precipitated silica featuring low water absorbency with silicone oil or dimethyldichlorosilane, respectively. In the process according to DE 26 28 975, the reaction is carried out with the hydrophobicizer (silicone oil) being added to the dry precipitated silica. In the process according to DE 27 29 244, the hydrophobicizer (dimethyldichlorosilane) is introduced directly into the precipitated silica suspension. In both cases, the hydrophobicizing step is followed by heat treatment at elevated temperatures, specifically between 200 and 400° C.

A disadvantage of this process is that the precipitated silica thus hydrophobicized becomes discolored at the required process temperatures. The discoloration of the silica is particularly inconvenient when it is added to silicone formulations; that is, when these hydrophobic precipitated silicas are added to silicone rubber formulations or to defoamer mixtures based on silicone oil.

As a measure of the discoloration it is possible to use the value known as reflectance. In measuring the reflectance, the diffuse reflection power of a sample is investigated. The higher the diffuse reflection power of the sample, the higher its reflectance and thus the higher the whiteness of the sample.

Precipitated silicas generally have a reflectance of not more than 97%. One object of the present invention is therefore to prepare an RTV 1C silicone rubber formulation comprising hydrophobic silica which has a high reflectance.

Discoloration occurs in particular with the hydrophobicizing of silicas when the silicas are strongly hydrophobicized: that is, have a high methanol wettability and high carbon loadings. It is precisely these properties, however, which are desired in RTV 1C silicone rubber formulations.

In order to fully develop their mechanical properties RTV 1C silicone rubber formulations need active reinforcing fillers. At present, only highly disperse pyrogenic silicas are used. A reinforcing filler must effect good mechanical properties in the vulcanizate, and the rheological properties set must remain stable even after prolonged storage.

RTV 1C silicone rubber formulations are processed at room temperature. In the case of silicone rubber formulations which cure by means of atmospheric humidity, too high a water content in the filler results in unwanted curing in the course of storage and in a low-grade surface of the vulcanizate. Accordingly, the water absorption characteristics, i.e., the amount of water adsorbed at different relative atmospheric humidities, constitute a measure of the processability of the filler.

A disadvantage of the known silica hydrophobicizing processes is that only a limited amount of hydrophobicizer can be attached covalently to the silica. Particularly in RTV 1C silicone rubber formulations, however, high carbon loadings are desired, since they permit establishment of and decisive improvements in the processing properties and/or the dispersing of the silica and also in the rheological properties, such as the thickening, i.e., the desired yield point and viscosity, of the compounds.

As a measure of the thickening, it is possible to utilize the DBP number. The DBP number indicates the absorption capacity of a silica for DBP. The measurement technique shows the amount of dibutyl phthalate, in g, of a sample of 100 g, at which a sharp increase in force in the compounder is observed.

The thickening action of the known hydrophobic precipitated silicas is probably attributable to their low carbon contents of less than 3.1% and/or to inhomogeneous hydrophobicizing. This lowers the maximum possible fraction of silica as filler in silicone rubber formulations. DE 26 28 975 lists data on the testing of hydrophobic precipitated silicas in silicone rubber formulations, in which the hydrophobic precipitated silica is used in increasing weight fractions. All the tables indicate that the mechanical properties of the silicone rubber vulcanizates are improved as the filler content goes up.

It would therefore be desirable to prepare RTV 1C silicone rubber formulations which include high fractions of hydrophobic silicas, for improving the mechanical properties, but which at the same time are still flowable and also feature good storage stability.

SUMMARY OF THE INVENTION

It is therefore an object of the present invention to provide a RTV 1C silicone rubber formulation which features a high fraction of filler such as hydrophobic silica, a high level of whiteness, and adjustable mechanical and rheological properties in combination with storage stability.

Another object of the present invention is to prepare an RTV 1C silicone rubber formulation comprising hydrophobic silica which has a high reflectance.

This and other objects have been achieved by the present invention the first embodiment of which includes a room temperature crosslinking, one component silicone rubber formulation, comprising:

A) from 0.5 to 60% by weight of a hydrophobic silica having the following properties:

a carbon content of >3.1%;

a methanol wettability of >60%;

a reflectance of >94%;

a BET/CTAB ratio of from >1 to <3;

a DBP absorption of <230 g/100 g;

a BET surface area of from 50 to 110 $m^2/g$;

a CTAB surface area of >30 $m^2/g$;

a water vapor absorption at 30° C. at an ambient humidity of 30 of <1.3;

a water vapor absorption at 30° C. at an ambient humidity of 70 of <1.7; and

B) 40-99.5% by weight of an organopolysiloxane of the formula $$Z_nSiR_{3-n}\text{—}O\text{—}[SiR_2O]_x\text{—}SiR_{3-n}\text{—}Z'_n$$

wherein each R represents independently alkyl, acetoxy, oxime, alkoxy, amido, aryl or alkenyl radicals, each having from 1 to 50 carbon atoms, each unsubstituted or substituted identically or differently by O, S, F, Cl, Br or I; or R represents independently polystyrene, polyvinyl acetate, polyacrylate, polymethacrylate, or polyacrylonitrile radicals, each having 50–10 000 repeating units;

wherein each Z represents independently OH, Cl, Br, acetoxy, amino, amido, amineoxy, oxime, alkoxy, alkenyloxy, acyloxy or phosphate radicals, wherein said acetoxy, amino, amido, amineoxy, oxime, alkoxy, alkenyloxy and acyloxy radicals each have up to 20 carbon atoms;

wherein each Z' represents independently oxime, alkoxy, amido or acetoxy radicals;

wherein n is 1–3; and wherein x is 100–15 000.

DETAILED DESCRIPTION OF THE INVENTION

It has been found that the above objects can be achieved by using a hydrophobic silica which has a low water content and low moisture absorption.

The present invention accordingly provides a room temperature crosslinking, one component (RTV 1C) silicone rubber formulation containing:

(A) from 0.5 to 60% by weight of hydrophobic silica having the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m²/g |
| CTAB surface area | >30 m²/g |
| water vapor absorption at 30° C. and 30 AH* | <1.3 |
| water vapor absorption at 30° C. and 70 AH* | <1.7 |

(*AH = ambient humidity)

and (B) 40–99.5% by weight of an organopolysiloxane of the formula $$Z_nSiR_{3-n}\text{—}O\text{—}[SiR_2O]_x\text{—}SiR_{3-n}\text{—}Z'_n$$

wherein R=alkyl, acetoxy, oxime, alkoxy, amido, aryl, alkenyl radicals, having from 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 50–10 000 repeating units.

Z=OH, Cl, Br, acetoxy, acryloxy, amido, amineoxy, oxime, alkoxy, alkenyloxy, acyloxy or phosphate radicals, wherein the organic radicals carry up to 20 carbon atoms, in each case identical or different.

Z'=oxime, alkoxy, amido, acetoxy radicals, n=1–3 x=100–15 000, preferably 100–11 000, with particular preference 100–8 000.

The hydrophobic silicas used may be pyrogenic silicas or precipitated silicas. The silicas preferably have the following physicochemical data:

| | |
|---|---|
| carbon content | ≧3.1% by weight, preferably ≧5.0%, with particular preference 3.1–10%, or from 4 to 7% by weight. The carbon content includes all values and subvalues therebetween, especially including 3.5, 4.0, 4.5, 5.0, 5.5, 6.0, 6.5, 7.0, 7.5, 8.0, 8.5, 9.0, and 9.5% by weight. |
| methanol wettability | ≧60%, preferably more than 65%, with particular preference more than 70 or 75%. The methanol wettability includes all values and subvalues between 60 and 100%, especially including 65, 70, 75, 80, 85, 90 and 95%. |
| reflectance | ≧94%, preferably >95%, with particular preference more than 96%. The reflectance includes all values and subvalues between 94 and 100%, especially including 94.5, 95, 95.5, 96, 96.5, 97, 97.5, 98, 98.5, 99 and 99.5%. |
| BET/CTAB ratio | >1 and <3. The BET/CTAB ratio includes all values and subvalues therebetween, especially including 1.2, 1.4, 1.6, 1.8, 2.0, 2.2, 2.4, 2.6 and 2.8. |
| DBP absorption | 50–230 g/100 g. The DBP absorption includes all values and subvalues therebetween, especially including 70, 90, 110, 130, 150, 170, 190 and 210 g/100 g. |
| BET surface area | 50–110 m²/g. The BET surface area includes all values and subvalues therebetween, especially including 60, 70, 80, 90 and 100 m²/g. |
| CTAB surface area | 30 to 110 m²/g. The CTAB surface area includes all values and subvalues therebetween, especially including 40, 50, 60, 70, 80, 90 and 100 m²/g. |

The ranges of preference specified may be adjusted independently of one another.

The hydrophobic silicas used may additionally, each independently of one another, be characterized by the following properties:

| | |
|---|---|
| modified Sears number | <1.6. The modified Sears number includes all values and subvalues between 1.6 and 0, especially including 1.4, 1.2, 1.0, 0.8, 0.6, 0.4 and 0.2. |
| pH | 5.0–9.0, preferably 7.0–8.5. The pH includes all values and subvalues therebetween, especially including 5.5, 6, 6.5, 7, 7.5, 8 and 8.5. |
| water content | <2%, preferably <1.5% The water content includes all values and subvalues between 2 and 0%, especially including 1.8, 1.6, 1.4, 1.2, 1.0, 0.8, 0.6, 0.4 and 0.2%. |
| conductivity | <500 µS, preferably 150 µS. Conductivity may be below 100, 60, 30, or even below 20 µS. |
| loss on ignition | >3%. The loss on ignition includes all values and subvalues between 3.1% and 100%, especially including 5, 10, 20, 30, 40, 50, 60, 70, 80, 90 and 100%. |

Silicas having a pH ≦7.0 may be obtained, for example, by using sulfuric acid to acidify the filtercake obtained by filtration following precipitation.

Preference is given to using a hydrophobic precipitated silica prepared by the following steps:
a) Preparing a mixture of an organopolysiloxane derivative and a precipitated silica.
b) Conditioning the mixture at from 10 to 150° C. for a period of from 0.5 to 72 h. The conditioning temperature includes all values and subvalues therebetween, especially including 20, 30, 40, 50, 60, 70, 80, 90, 100, 110, 120, 130 and 140° C. The conditioning time includes all values and subvalues therebetween, especially including 1, 5, 10, 15, 20, 25, 30, 35, 40, 45, 50, 55, 60, 65 and 70 h.
c) Conducting oxidative heat treatment at more than 300° C. with an oxidizing gas.

The thorough distribution of the hydrophobicizer and the high degree of hydrophobicization of a hydrophobic precipitated silica thus prepared result in RTV 1C silicone rubber formulations in targetedly adjustable thickening, unimpaired even by prolonged storage, in conjunction with good mechanical and optical properties in the vulcanizates.

The hydrophobic silica is preferably prepared with an organopolysiloxane derivative such as polydimethylsiloxane, so that after heat treatment its only organic radicals are methyl groups. This going hand in hand with a very high thermal load-bearing capacity (>300° C. with ingress of air does not lead to discolorations).

The hydrophobic silicas are prepared using preferably silicas with a low silanol group density. The measure used for the amount of silanol groups is the modified Sears number, i.e., the alkali consumption of an acid-base titration. One measure of the silanol group density is the modified Sears number, defined below, in conjunction with the BET surface area.

The reaction conditions employed in the heat treatment of the silica do not lead to carbonization and thus lead to virtually no discoloration. For this reason it is important that the hydrophilic base silica contains no organic impurities, since otherwise there may be discoloration on heat treatment. Since the cleavage products which form as a result of the heat treatment, and which are gaseous under the process conditions, may bring about a certain degree of discoloration even in an oxidizing atmosphere, it is important to remove these cleavage products from the product by means of a sufficient throughput of gas.

The use of liquid polysiloxane, preferably polydimethylsiloxane of preferably 30–100 mPas·sec, permits optimum distribution on the base silica. The viscosity of the polysiloxane includes all values and subvalues therebetween, especially including 40, 50, 60, 70, 80 and 90 mPas·sec. Under the oxidative reaction conditions, the polydimethylsiloxanes used are able to undergo resinification. This has the great advantage that the hydrophobicizer can be distributed on the silica in liquid form and then fixed. The amount of bound carbon can be greatly increased by the oxidative heat treatment.

Figure 1:
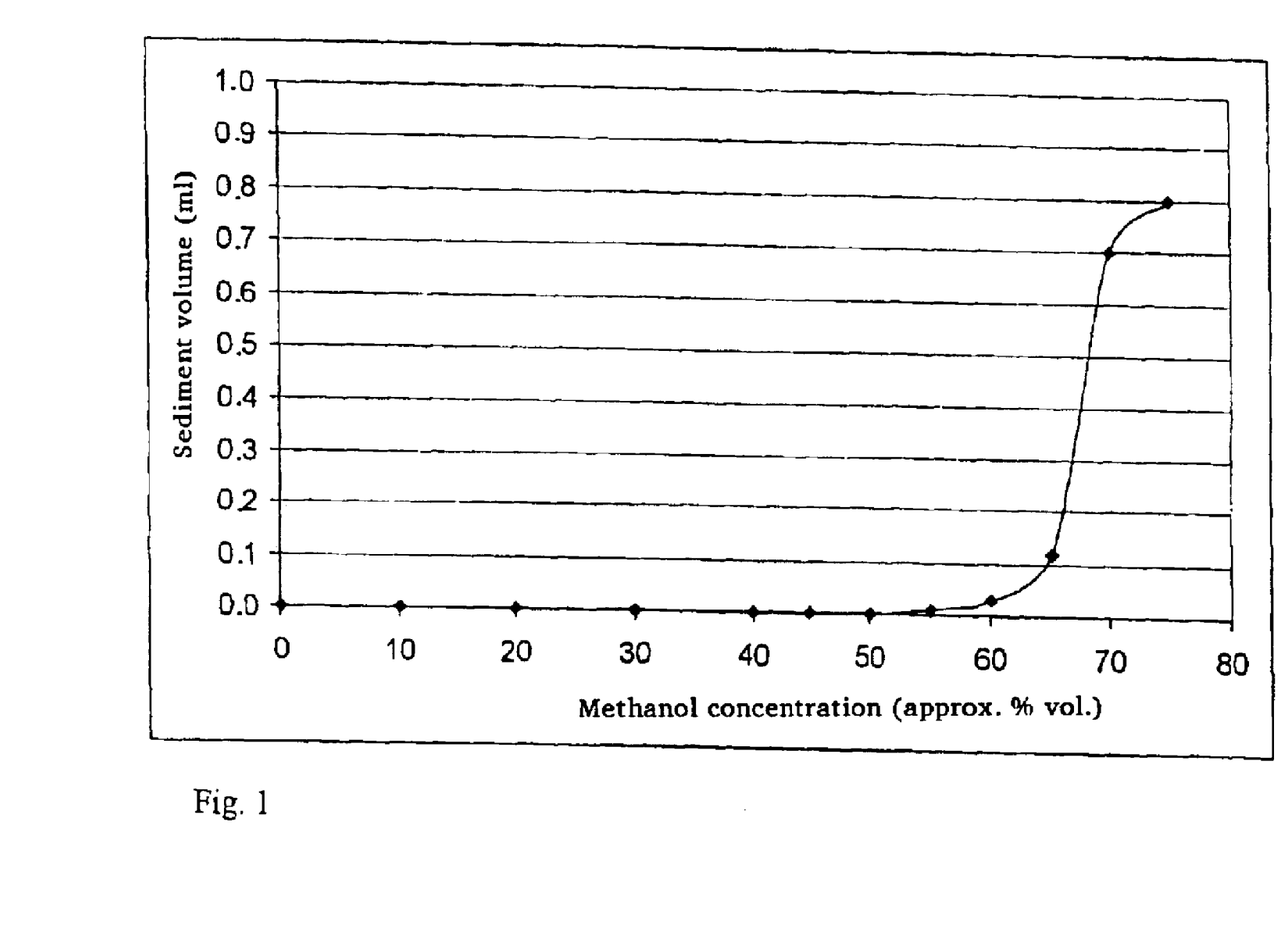
FIG. 1 shows a methanol wettability curve of the silica used in the present invention.
Figure 2:
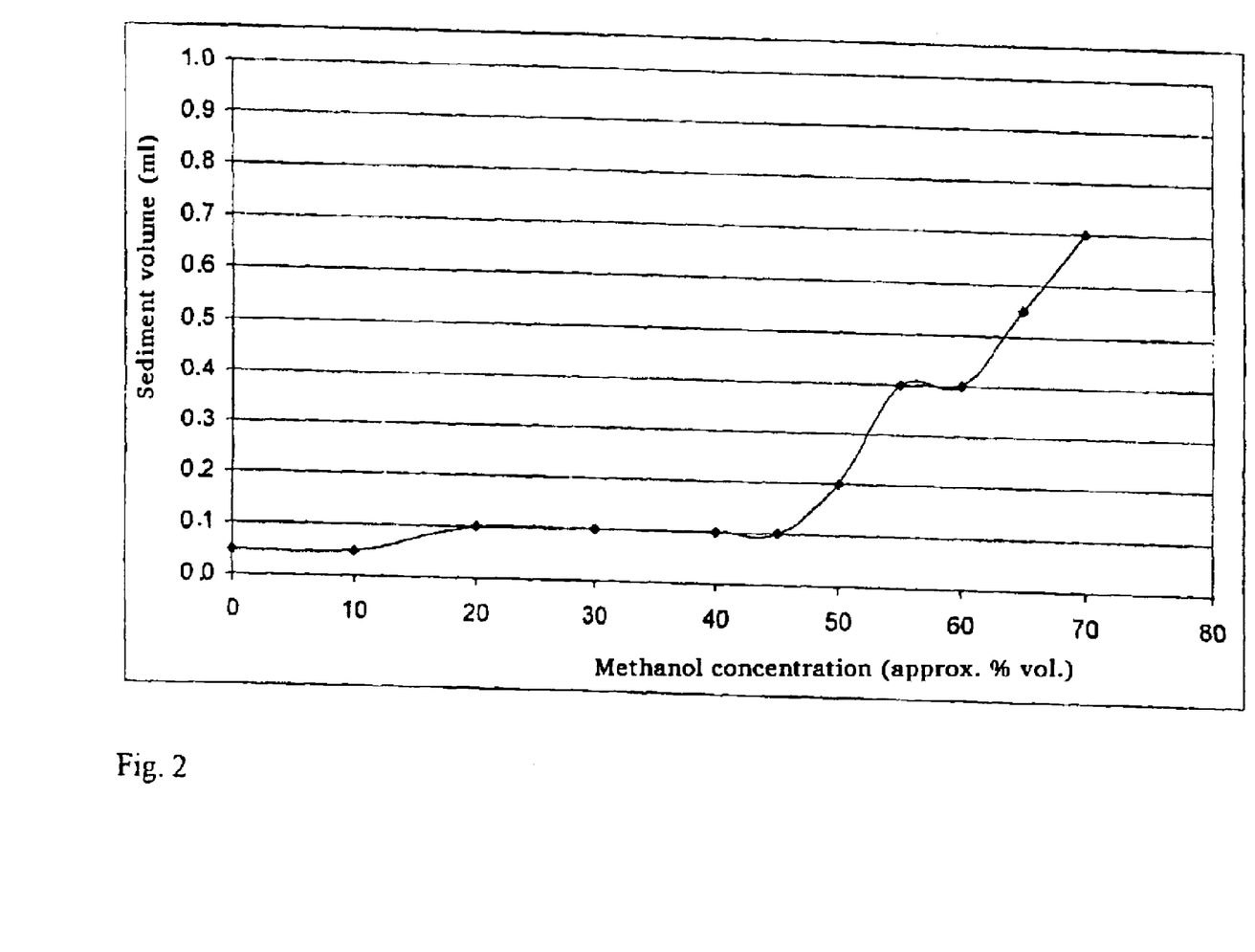
FIG. 2 shows a methanol wettability curve of customary hydrophobic silica.

The silicas used with preference exhibit a steep methanol wettability curve; in other words, homogeneous hydrophobicization has taken place (FIG. 1). FIG. 2 shows the methanol wettability of customary hydrophobic silicas.

High carbon loadings and high methanol wettabilities bring about decisive improvements in the properties of silicas in the novel silicone rubber formulations. The further reduction in moisture absorbency of the silicas permits use in RTV 1C silicone rubber formulations, so that adequate storage properties are obtained in the formulations of the invention. The hydrophobic silicas containing high levels of carbon exhibit substantially improved rheological properties in the silicone rubber formulations of the invention, i.e., they have only a low thickening action as a function of the level of silica filling. This low thickening action makes it possible to prepare flowable silicone rubber formulations. When using a hydrophobic silica prepared from precipitated silicas, the rheological properties of the RTV 1C formulations of the invention may be improved by the addition of a pyrogenic silica. In this case, preferably 0.01–12%, with particular preference 0.05–4% by weight of a pyrogenic silica is used. The amount of pyrogenic silica includes all values and subvalues therebetween, especially including 0.05, 0.1, 0.5, 1, 2, 3, 4, 5, 6, 7, 8, 9, 10 and 11% by weight.

As pyrogenic silica it is possible to use hydrophilic (e.g., Aerosil 300, Degussa AG) or hydrophobic (e.g., Aerosil R 812 S, Degussa AG) silicas.

Additionally, higher filling levels lead to markedly improved mechanical properties in the vulcanizates.

The hydrophobic precipitated silicas may be prepared in three steps:
a) first of all, a liquid polysiloxane derivative is initially distributed, physically, on the silica surface (process step a)). Where this initial distribution is carried out in aqueous media, i.e., suspensions or silica with a water content of more than 70%, the silica is typically unstable. It must therefore be isolated quickly by filtration following the initial distribution, and/or subjected to accelerated drying (in a spin-flash drier or nozzle tower drier, for example). This conserves the distribution of the organopolysiloxane droplets on the silica and prevents separation into water, silicone oil, and silica.
b) Subsequently, in a controlled conditioning step—process step b)—the distribution of the hydrophobicizer is improved further and engagement of the polysiloxane derivative with the silica surface is achieved. This state of distribution is stable even in aqueous media. Following process step b), there is no longer any separation between the polysiloxane derivative and the silica. At carbon contents ≧3.1, the conditioned silicas can be adjusted steplessly to a methanol wettability of up to 55%. The BET/CTAB ratio after this step is <1. The binding of the polysiloxane to the silica is thought to be a result of the formation of multiple hydrogen bonds between the siloxane bridges of the polysiloxane molecules and the silanol groups on the silica surface.
c) This is followed by a heat treatment in an oxidizing atmosphere (process step c)), which suppresses discoloration phenomena, ensures covalent binding of the hydrophobicizing agent, and—probably as a result of the formation of gaseous cleavage products—increases further the distribution of the hydrophobicizer. Heat treated silicas, with a lower carbon content than the corresponding conditioned silica, have a higher methanol wettability. Heat treatment in an oxidizing atmosphere assists the resinification of the polysiloxanes, so that much larger amounts of hydrophobicizer can be anchored covalently on the silica. The BET/CTAB ratio has turned around and is now >1.

As the organopolysiloxane derivative it is possible to use all organosilanes or organohalosilanes which are commonly used to hydrophobicize precipitated silicas.

Step a) of the process for preparing the hydrophobic silica can be conducted with the following variants:
Addition of organopolysiloxane derivative to a precipitated silica having a water content of from 1 to 80% by weight, preferably from 20 to 60% by weight. The water content of the precipitated silica includes all values and subvalues therebetween, especially including 5, 10, 15, 20, 25, 30, 35, 40, 45, 50, 55, 60, 65, 70 and 75% by weight.

Addition of the organopolysiloxane derivative to a dispersion of the precipitated silica, i.e., following precipitation of silicate with an acid, for example, using a Rhein-Hütte mixer or Kotthoff-Mischsirene or Ultra-Turrax. This necessitates rapid filtration and/or accelerated drying after the reaction.

Addition of the organopolysiloxane derivative to a precipitated silica having a water content of from 70 to 99% by weight, with subsequent isolation of the solid from the water. The water content of precipitated silica includes all values and subvalues therebetween, especially including 72, 74, 76, 78, 80, 82, 84, 86, 88, 90, 92, 94, 96 and 98% by weight. Isolation can be effected by filtration, nozzle tower, spin-flash, or other accelerated drying. The higher the water content, the more quickly isolation should be carried out. Separation should be avoided.

Simultaneous supplying of the precipitated silica or hydrous silica (in the form, for example, of filtercake, dispersion or suspension) and the organopolysiloxane derivative to a spin-flash drier.

Mixing of dry precipitated silica with polysiloxane, in a Gericke mixer, for example.

An alternative possibility is first to prepare a masterbatch, i.e., a conditioned precipitated silica, obtained according to process steps a) and b), and to mix it with a (hydrophilic) hydrous precipitated silica (e.g., filtercakes, silica suspensions or silica dispersions).

The water content of the hydrophilic precipitated silica may vary within the ranges mentioned above.

The base silica may be coated in a mass ratio, for example, of from 1:1 to 1:3 with silicone oil, e.g., DOW CORNING (R) 200 FLUID 50 CS (50 mPas·sec dimethylpolysiloxane terminated with trimethylsilyl groups, carbon content of approximately 33%) (step a)). The mass ratio of the base silica to silicone oil includes all values and subvalues therebetween, especially including 1:1.5, 1:2 and 1:2.5. The resulting powder is conditioned at a temperature of more than 100° C. for half an hour, for example. The conditioning (step b) here is carried out until the resulting material is wettable by water (methanol wettability <20%; regarding the definition of methanol wettability see the measurement technique section) but which when introduced into water no longer exhibits any separation between silica and silicone oil. If step c) directly follows step b), a methanol wettability >20% is preferred. Mixing of this masterbatch, (e.g., 50% by weight silica and 50% by weight silicone oil) with aqueous silica dispersions or silica suspensions produces stable mixtures in which the silicone oil no longer separates from the silica. The total mixture typically contains one part by weight of silicone oil, about 4–8 parts by weight of silica, and 20–60 parts by weight of water. The amount of silica in the mixture includes all values and subvalues therebetween, especially including 5, 6 and 7 parts by weight. The amount of water in the mixture includes all values and subvalues therebetween, especially including 25, 30, 35, 40, 45, 50 and 55 parts by weight. In order to prepare such a suspension, for example, the masterbatch (e.g., 50% silica and 50% silicone oil) can be mixed thoroughly with about 10–16 times the amount of filtercake (solids content approximately 20%) and about 10–20 times the amount of additional water. The master batch can be mixed with 11, 12, 13, 14 and 15 times the amount of filter cake and with 11, 12, 13, 14, 15, 16, 17, 18 and 19 times the amount of additional water. The advantage of this procedure is that the water-wettable masterbatch (which contains up to 75% of hydrophobic organopolysiloxane) can be dispersed directly in silica precipitation suspensions or silica feeds, very finely and stably, without the need to use emulsifiers or surfactants. After such a mixture has been dried, or filtered and then dried, the organopolysiloxane-containing silica thus obtained can be conditioned again (step b).

These steps can be carried out individually, where appropriate with grinding beforehand. Grinding should not, however, be carried out before coating a). It is also possible to carry out two or more of these variants—that is, identical or different variants—in succession. The following embodiments of the process of the invention are preferred:

One of steps a), b), and c) is performed a number of times (from 2 to 5 times) in succession.

Steps a) and b) are carried out a number of times (from 2 to 5 times) in succession.

All steps a), b), and c) are carried out a number of times (from 2 to 5 times) in succession; in other words, the process is run through a number of times.

Process step b) is preferably carried out by heat treatment at 100–150° C. over the course of from 0.5 to 2 hours. The temperature of the heat treatment includes all values and subvalues therebetween, especially including 110, 120, 130 and 140° C. The treatment time includes all values and subvalues therebetween, especially including 1 and 1.5 hours. After conditioning, the partly hydrophobicized silica present may have a methanol wettability of 20% or more. Fundamentally, a distinction may be made between wet and dry hydrophobicization.

Wet hydrophobicization means that the silicate starting materials are aqueous silica suspensions, silica feeds, or high water content silica filtercakes, which are coated with the corresponding hydrophobicizers, as described, for example, in DE 27 29 244 for precipitation suspensions with organohalosilanes.

Dry hydrophobicization means that the silicate starting materials are silica powders with different moisture contents of from 1 to 75%, which are coated with the corresponding hydrophobicizers. This process is described, for example, in DE 26 28 975. The moisture content of the silica powders includes all values and subvalues therebetween, especially including 5, 10, 15, 20, 25, 30, 35, 40, 45, 50, 55, 60, 65 and 75%.

The silica of the invention is prepared using organopolysiloxane derivatives. It is, however, also possible to use other silicon compounds which react to give organopolysiloxanes under the chosen reaction conditions (for example, dichlorodimethylsilane in an aqueous environment).

Hydrophobicizing reagents used comprise organopolysiloxane derivatives or their precursors, for example, those with the composition $R_{4-n}SiX_n$ (where n=1, 2, 3), $[SiR_xX_yO]_z$ (where $0 \leq x \leq 2$, $0 \leq y \leq 2$, $3 \leq z \leq 10$, with x+y=2), $[SiR_xX_yN]_z$ (where $0 \leq x \leq 2$, $0 \leq y \leq 2$, $3 \leq z \leq 10$ with x+y=2), $SiR_nX_mOSiR_oX_p$ (where $0 \leq n \leq 3$, $0 \leq m \leq 3$, $0 \leq o \leq 3$, $0 \leq p \leq 3$, with n+m=3, o+p=3), $SiR_nX_mNSiR_oX_p$ (where $0 \leq n \leq 3$, $0 \leq m \leq 3$, $0 \leq o \leq 3$, $0 \leq p \leq 3$, with n+m=3, o+p=3), $SiR_nX_m[SiR_xX_yO]_zSiR_oX_p$ (where $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10\,000$ with n+m=3, x+y=2, o+p=3). These compounds may be linear, cyclic, and branched silane, silazane and siloxane compounds. R may comprise alkyl and/or aryl radicals, which may be substituted by functional groups such as the hydroxyl group, the amino group, polyethers such as ethylene oxide and/or propylene oxide, and halide groups such as fluoride, chloride, bromide or iodide. R may also contain groups such as hydroxyl, amino, halide, alkoxy, alkenyl, alkynyl, and aryl groups, and groups containing sulfur. X may comprise reactive groups such as silanol, amino, mercapto, halide, alkoxy, alkenyl, and hydride groups.

Preference is given to using linear polysiloxanes having the composition $SiR_nX_m[SiR_xX_yO]_zSiR_oX_p$ (where $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10\ 000$ with n+m=3, x+y=2, o+p=3) in which R is preferably represented by methyl.

Particular preference is given to using polysiloxanes having the composition $SiR_nX_m[SiR_xX_yO]_zSiR_oX_p$ (where $0 \leq n \leq 3$, $0 \leq m \leq 1$, $0 \leq x \leq 2$, $0 \leq y \leq 0.2$, $0 \leq o \leq 3$, $0 \leq p \leq 1$, $1 \leq z \leq 1\ 000$ with n+m=3, x+y=2, o+p=3) in which R is preferably represented by methyl.

In the above-described process, however, it is also possible to use polysiloxanes of low volatility which contain no functional groups.

Because of the presence of certain functional groups in the polysiloxane used, salts or low molecular mass substances such as $NH_3$, amines, alcohols, etc. may be formed, which can lead to disruptive impurities. An important exception here is constituted by silanol-functionalized polysiloxanes, since the only impurity formed here is water, which is easy to remove under the chosen process conditions.

With preference, the hydrophobicizer may comprise a methyl-terminated polydimethylsiloxane, in particular one having a viscosity of 30–100 mPas·sec, preferably 40–60 mPas·sec. An example of a suitable polysiloxane oil is DOW CORNING (R) 200 FLUID 50 CS. The viscosity of the methyl terminated polydimethylsiloxane includes all values and subvalues therebetween, especially including 40, 50, 60, 70, 80 and 90 mPas·sec.

Since the aforementioned hydrophobicizers are compounds of low volatility, an important part in the initial distribution of the hydrophobicizers on the silica surface is played by capillary forces and diffusion events at the liquid/solid phase boundary.

Even if the hydrophobicizers used with preference exhibit a certain volatility in the course of a thermal treatment, the liquid/solid distribution is still important. For this reason, a distinction is made here between physical initial distribution, conditioning, and heat treatment.

The heat treatment, i.e., process step c), is conducted at at least 300° C., preferably above 350° C., with very particular preference at 360–370° C., with an oxidizing gas. The temperature of the heat treatment includes all values and subvalues therebetween, especially including 310, 320, 330, 340, 350, 360, 362, 364, 366 and 368° C. This gas can be air, $Cl_2$, $N_yO_x$ ($NO_2$, $N_2O_5$, NO, $N_2O$), $O_3$, $O_2$, $Br_2$, $F_2$, or a mixture of these gases with further inert gases such as $CO_2$, $N_2$ or burner waste gases, in each case preferably at not less than 1% by volume.

Additionally, the oxidizing gas may optionally contain up to 80%, preferably up to 50%, with particular preference 20–40%, by volume of water. The amount of water in the oxidizing gas includes all values and subvalues therebetween, especially including 5, 10, 15, 20, 25, 30, 35, 40, 45, 50, 55, 60, 65, 70 and 75%.

In every case, a good gas throughput must be ensured. As far as possible, the gas must reach every silica particle. An apparatus suitable for ensuring this includes, for example, a metal lattice oven, a fluidizing chamber, and a belt reactor. The oxidative heat treatment in process step c) may also be conducted under fluidic conditions. These conditions may be set in a suspended bed, moving bed, fluidized bed and/or turbulent bed.

Following the conditioning step and/or heat treatment, the hydrophobicized silica is optionally ground. Grinding before the coating step a), however, is not appropriate, and leads to low-grade products with inhomogeneous hydrophobicization.

Optional grinding gives a silica having a $d_{4,3}$ of 8–25 $\mu$m, preferably 8–15 $\mu$m. The $d_{4,3}$ of the silica includes all values and subvalues therebetween, especially including 10, 12, 14, 16, 18, 20, 22 and 24 $\mu$m.

For the RTV 1C silicone rubber mixtures of the present invention it is important that there are no organic constituents on the silica which might undergo discoloration under the influence of oxygen. Organosilicon compounds containing exclusively methyl, phenyl, fluorocarbon or hydrofluorocarbons as organic radicals are extremely temperature-stable even in the presence of atmospheric oxygen. In order, however, to achieve effective cleavage of the stable siloxane bridges of siloxane compounds and to bond them covalently to the silica, temperatures above 300° C. are required. At these high temperatures, siloxane compounds, especially in the case of precipitated silicas with a low silanol group density, normally lead to discoloration phenomena on the silica. The process described for preparing the hydrophobic silicas needed in the silicone rubber formulations of the invention makes it possible to suppress this discoloration. These discoloration phenomena are measured by reflectance measurements with an optical measurement technique based on diffuse reflection. Where the reflectances of silica are >94%, the silica-filled silicone rubber compound appears pure white. Since the refractive indices of silica and silicone rubber are close to one another, even very small impurities and discolorations in the silica filler become clearly visible in the silicone rubber. A reflectance of 93% already leads to a marked discoloration in the silicone rubber, visible with the naked eye, despite the fact that the silica powder before incorporation appears pure white to the viewer.

The formulations of the present invention maybe used as RTV 1C silicone sealing compounds, in particular as self-leveling sealing compounds, as jointing compounds, window sealing compounds, seals in motor vehicles, heat-resistant seals, oil-exuding seals, chemical-resistant seals, and water-vapor-resistant seals.

As organopolysiloxanes it is possible to use any polysiloxanes which have been used to date or could be used as a basis for room temperature crosslinking. (RTV) compositions which form organopolysiloxane elastomers. They may be described, for example, by the general formula $$Z_nSiR_{3-n}-O-[SiR_2O]_x-SiR_{3-n}-Z'_n$$

where x, R, Z', and Z possess the definitions already specified.

Within and/or along the siloxane chain in the formula indicated above it is also possible for siloxane units other than diorganosiloxane units to be present, said siloxane units normally being present only as impurities, examples being those of the formulae $RSiO_{3/2}$, $RSiO_{1/2}$, and $SiO_{4/2}$, where R in each case has the definition indicated above for it. The amount of these other siloxane units should not exceed 10 mole percent. The amount of other siloxane units includes all values and sub-values between 0 and 10 mole percent, especially including 1, 2, 3, 4, 5, 6, 7, 8 and 9 mole percent.

Preferred examples of R with the definition of alkyl radical are methyl, ethyl, propyl, butyl, hexyl, and octyl radicals. As alkenyl radicals it is preferred to use vinyl, allyl, ethylallyl, and butadienyl radicals. As aryl radicals it is preferred to use phenyl and tolyl radical.

Preferred examples of substituted hydrocarbon radicals R are, in particular, halogenated hydrocarbon radicals such as the 3,3,3-trifluoropropyl radical, chlorophenyl radical and bromotolyl radical; and cyanoalkyl radicals, such as the β-cyanoethyl radical.

Preferred examples of polymers as radical R are polystyrene, polyvinyl acetate, polyacrylate, polymethacrylate and polyacrylonitrile radicals attached via carbon to silicon.

Due to their easier availability, the predominant fraction of the radicals R is preferably composed of methyl groups. The other radicals R are, in particular, vinyl and/or phenyl groups.

Particularly in the case where the formulations present cure at room temperature to elastomers on the ingress of water, while being storable in the absence of water, Z and Z' are hydrolyzable groups. Examples of such groups are acetoxy, amino, amineoxy, alkenyloxy (e.g., $H_2C=CCH_3CO-$), acyloxy, and phosphate groups. Particularly due to the easier availability, acyloxy groups, especially acetoxy groups, are preferred as Z. Excellent results are, however, also achieved using oxime groups, for example, such as those of the formula $-ON=C(CH_3)(C_2H_5)$, as Z.

Examples of hydrolyzable atoms Z are halogen atoms and hydrogen atoms; examples of alkenyl groups Z are, in particular, vinyl groups.

The viscosity of the organopolysiloxanes used in the context of the invention ought not to exceed 500 000 cP at 25° C., preferably 150 000 cP at 25° C. Accordingly, the value x ought preferably not to exceed 40 000.

Examples of organopolysiloxanes which can be used are the silicone polymers E50 (α,ω-hydroxydimethylsiloxypolydimethylsiloxane) or M50 (α,ω-hydroxydimethylsiloxypolydimethylsiloxane) from GE Bayer Silicones.

It is also possible to use mixtures of different organopolysiloxanes.

The mixing of these organopolysiloxanes with the hydrophobic silicas and, where appropriate, the further constituents of the formulation of the invention may take place in any desired, known way, for example, in mechanical mixers. It happens very rapidly and easily, irrespective of the sequence in which the constituents of the mixture are added.

The silicas used in accordance with the invention are used preferably in amounts of from 0.5 to 60% by weight, more preferably from 3% to 30% by weight, based on the total weight of the compositions which can be cured to elastomers. The amount of silica in the composition includes all values and subvalues therebetween, especially including 1, 5, 10, 15, 20, 25, 30, 35, 40, 45, 50 and 55% by weight.

Where the only reactive terminal units present in the diorganopolysiloxanes which contain reactive terminal units are those containing Si-bonded hydroxyl groups, it is necessary to crosslink these diorganopolysiloxanes. This can be done in a manner known per se by means of the water present in air, where appropriate with the addition of further water with a crosslinking agent. In this case it is possible to use, for example, the Silopren crosslinker 3034 from GE Bayer Silicones, or ethyltriacetoxysilane optionally in the presence of a condensation catalyst, in a known manner. Suitable catalysts for all formulations of the invention are, for example, the Silopren catalysts DBTA type 162 (dibutyltin diacetate) from the same manufacturer, dioctyltindilaurate or di-n-butylbis(acetyl-acetone).

In a preferred embodiment of the silicone rubber formulations of the present invention crosslinker may be present in an amount of 0.5–20% by weight, preferably 2–10% by weight, the crosslinker having the formula $R'_{4-t}SiZ'_t$ wherein R'=alkyl, alkoxy, acetoxy, oxime, amido, aryl, alkenyl radicals, having from 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 5–5 000 repeating units.

Z'=OH, Cl, Br, acetoxy, oxime, amino, amido, amineoxy, alkenyloxy, aryloxy or phosphate radicals, it being possible for the organic radicals to carry up to 20 carbon atoms, in each case identical or different.

t=3 or 4.

The amount of crosslinker includes all values and subvalues therebetween, especially including 1, 3, 5, 7, 9, 11, 13, 15, 17 and 19% by weight.

All amounts by weight are based on the total amount of silicone formulations.

Preferred examples of silanes of the formula indicated above are ethyltriacetoxysilane, methyltriacetoxysilane, isopropyltriacetoxysilane, isopropoxytriacetoxysilane, vinyltriacetoxysilane, methyltrisdiethylaminooxysilane, methyltris(cyclohexylamino)silane, methyltris(diethylphosphato)silane, and methyltris(methyl ethyl ketoximo)silane.

The cited combination of physicochemical data of the hydrophobic precipitated silica results in an excellent reinforcing filler. The markedly reduced (relative to the known precipitated silicas) equilibrium moisture content brings advantages in processing, in the course of dispersing, for example. The optimally adjusted pH and the low DBP number lead to perceptibly reduced incorporation times. The low electrolyte content in combination with the low moisture content leads, finally, to good electrical properties in the vulcanizates. In cold-curing silicone rubber sealing compounds, the low water content of the hydrophobic precipitated silica used gives advantages for the storage properties of the uncured compositions. The reduced water content also leads to better long-term chemical load-bearing capacities in the vulcanizates.

Besides organopolysiloxanes, hydrophobicized silica, crosslinking agents and crosslinking catalysts, formulations of the invention may of course where appropriate include fillers which are conventionally, often or usually used in compositions that can be cured to elastomers. Examples of such substances are fillers having a surface area of less than 50 m²/g, such as quartz flour, kaolin, phyllosilicates, clay minerals, diatomaceous earth, and also zirconium silicate and calcium carbonate, and also untreated pyrogenic silica, organic resins, such as polyvinyl chloride powders, organopolysiloxane resins, fibrous fillers, such as asbestos, glass fibers and organic pigments, soluble dyes, fragrances, corrosion inhibitors, agents which retard curing, such as benzotriazole, and plasticizers, and also trimethylsiloxyendblocked dimethylpolysiloxanes.

The RTV 1C silicone rubber formulations of the present invention may optionally contain 0.1–20% by weight, preferably 0.1–15% by weight, with particular preference 0.1–10% by weight (based on the total amount of the formulation) of water-binding substances. The amount of the water-binding substances includes all values and subvalues therebetween, especially including 1, 2, 4, 6, 8, 10, 12, 14, 16 and 18% by weight. Preferred examples of substances for this purpose are carboxylic anhydrides, such as acetic anhydride or maleic anhydride, and/or carbonic esters such as diethyl carbonate, ethylene carbonate and/or alkenyloxy compounds and/or ketals such as dimethyldioxolane, for example. It is possible to use one or more of such substances.

Additionally, the silicone rubber formulations may contain from 0.01 to 99.5% by weight of an unfunctionalized polysiloxane. In this case it is possible to use the polysiloxanes already mentioned, provided they are unfunctionalized. An example of a suitable unfunctionalized polysiloxane is Baysilone oil M1000 (polydimethylsiloxane) from GE Bayer Silicones. The amount of unfunctionalized polysiloxane includes all values and subvalues therebetween, especially including 0.05, 0.1, 0.5, 1, 5, 10, 15, 20, 25, 30, 35, 40, 45, 50, 55, 60, 65, 70, 75, 80, 85, 90 and 95% by weight.

The silicone rubber formulations may further contain 1) from 0.01 to 6% by weight of organic or inorganic compounds of the metals Pt, Sn, Ti and/or Zn as catalyst and/or 2) from 0.01 to 6% by weight of inhibitors and/or 3) 0.01–6% by weight of fungicides and/or bactericides and/or 4) from 0.01 to 6% by weight of adhesion promoters (such as, for example, Silopren adhesion promoter 3001 from GE Bayer Silicones, with the following composition: di-tert-butoxydiacetoxysilane) and 5) from 0.01 to 6% by weight of stabilizers (such as, for example, Silopren Stabilizer TP 3566 from GE Bayer Silicones). The amount of catalyst includes all values and subvalues therebetween, especially including 0.05, 0.1, 0.5, 1, 1.5, 2, 2.5, 3, 3.5, 4, 4.5, 5 and 5.5% by weight. The amount of inhibitor includes all values and subvalues therebetween, especially including 0.05, 0.1, 0.5, 1, 1.5, 2, 2.5, 3, 3.5, 4, 4.5, 5 and 5.5% by weight. The amount of fungicides and/or bactericides includes all values and subvalues therebetween, especially including 0.05, 0.1, 0.5, 1, 1.5, 2,2. 5,3, 3.5, 4, 4.5, 5 and 5.5% by weight. The amount of adhesion promoter includes all values and subvalues therebetween, especially including 0.05, 0.1, 0.5, 1, 1.5, 2, 2.5, 3, 3.5, 4, 4.5, 5 and 5.5% by weight. The amount of stabilizer includes all values and subvalues therebetween, especially including 0.05, 0.1, 0.5, 1, 1.5, 2, 2.5, 3, 3.5, 4, 4.5, 5, and 5.5% by weight.

Having generally described this invention, a further understanding can be obtained by reference to certain specific examples which are provided herein for purposes of illustration only, and are not intended to be limiting unless otherwise specified.

EXAMPLES

As the silicate starting material, it is preferred to use precipitated silicas which possess a very low silanol group density, i.e., a low alkali consumption/BET surface area ratio, a relatively high CTAB surface area for approximately the same BET surface area, and a high level of whiteness and purity.

Preparation of Base Silica 50.0 m$^3$ of water are charged to a reaction vessel. Slowly, 9.2 m$^3$ of waterglass solution and 0.9 m$^3$ of H$_2$SO$_4$ are added with stirring to the initial charge, an alkaline pH being maintained in the mixture during the addition. After the end of the addition of waterglass and H$_2$SO$_4$, the pH of the resulting suspension is within the alkaline range. The suspension is acidified and filtered, and the solid product is washed with deionized water. The hydrophilic base silica can be dried, preferably by an accelerated drying method. The following data relate to the dried precipitated silica thus obtained.

| | |
|---|---|
| BET surface area [m$^2$/g] | 150–170 |
| CTAB surface area [m$^2$/g] | 150–170 |
| Loss on ignition based on the substance | 3 ± 0.5 |

-continued

| | |
|---|---|
| dried 2 h/105° C. (DIN 55921) [%] | |
| pH 5% (methanol/aqueous solution) (DIN 53200) | 6–7 |
| Conductivity (in 5% aqueous dispersion) [µS] | <100 |
| Tapped density [g/l] | >250 |
| Sears number | <13 |

The base silica and the polysiloxane are mixed until a defined carbon content is obtained; in other words, the mixing ratio is a function of the arithmetic proportion for setting the required carbon content.

1. Measurement Techniques 1.1 Methanol Wettability

Silicas whose surfaces have been modified with nonhydrolyzable organic groups are usually not wetted by water.

These hydrophobic silicas can, however, be wetted by a methanol/water mixture. The fraction of methanol in this mixture—expressed as a percentage by weight—is a measure of the hydrophobicity of modified silica. The higher the methanol fraction, the better the hydrophobicization of the substance.

Procedure:

200 mg of each hydrophobic silica or silicate sample is weighed out into 6 centrifuge tubes each with a capacity of 15 ml, and each of the tubes is filled with 8 ml of a methanol/water mixture of ascending methanol concentration. The methanol concentration of the mixtures is guided by the anticipated methanol wettability. The centrifuge tubes are tightly sealed and then shaken vigorously (10 up-and-down motions). To separate the wetted silica/silicate fractions, the tubes are then centrifuged at 2500 rpm for 5 minutes. The wetted fractions form a sediment whose volume can be read off on the scale on the centrifuge tubes. On a graph, the sediment volumes are plotted against the methanol/water mixture concentration. These individual points produce a curve whose position and steepness characterizes the degree of hydrophobicization of the sample under analysis.

Apparatus:

Precision Balance

Centrifuge

Centrifuge Tubes, Graduated

Dispensettes 1.2 DBP absorption

The DBP absorption (DBP number), which is a measure of the absorbency of the precipitated silica, is determined as follows:

The dibutyl phthalate number is determined using the Brabender plastograph. The DBP number is a measure of the absorbency of a pulverulent product for liquid. The absorbency is dependent on the moisture content, the particle size, and the initial mass of material analyzed.

Apparatus and Reagents

Brabender Plastograph with Plotter

Multi-Dosimat E 415 (501) from Metrohm

Dibutyl Phthalate

Procedure 12.5 g of silica are introduced into the kneader of the Brabender plastograph. With continued mixing (kneader paddle speed 125 rpm), dibutyl phthalate runs into the mixture at a rate of 4 ml/minute. The force required for incorporation is low. Toward the end of the determination, the mixture becomes poorly free-flowing. This fact is documented in an increase in the required force, which is indicated on the scale. When the scale has moved by 300, DBP metering is automatically shut off.

Evaluation

The density of DBP is 1.047 g/ml. The DBP absorption is based on the anhydrous, dried substance. When using precipitated silicas of relatively high moisture content, the value must be corrected using the following table if these silicas are not dried prior to the determination of the DBP number.

Correction table for dibutyl phthalate absorption—anhydrous—

| % water | correction figure | | | | |
|---|---|---|---|---|---|
|  | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

The correction figure corresponding to the water content is added to the experimentally determined DBP value; for example, a water content of 5.8% would mean an add-on of 33 g/100 g for the DBP absorption.

1.3 Particle size

The particle size is determined using a Malvern Mastersizer in ethanol following ultrasound treatment for 5 minutes. The measurement is made automatically and provides the average particle size $d_{4,3}$ from a volume distribution.

1.4 Determination of the tristimulus value $R_y$ in accordance with DIN 5033

Application

Using the Datacolor 3890 spectrophotometer, the tristimulus value $R_y$ is determined for silicas, silicates, and zeolites (powder suspension).

Analytical Procedure:

The silica to be analyzed is first ground to an average particle diameter of about 8 to 15 μm and then pressed to a tablet using a powder press. The amount required depends on the fineness of the powder. The amount of powder introduced is such that the thread of the press closure reaches its last turn.

The samples are placed under the meter, and whiteness measurements $R_y$ and $R_{460}$ are selected from the menu of the control computer. After the sample designation has been entered, the space key is operated in order to start the measurement.

Following entry of the memory code, the measurements are printed out.

The values are calculated automatically in accordance with the following formula:

$$y = \sum_{400}^{700} S*(\lambda) * Y(\lambda) * R(\lambda)$$

where
$Y(\lambda)$ is the standard distribution coefficient,
$S(\lambda)$ is the relative spectral radiation distribution of the illumination source, and
$R(\lambda)$ is the spectral reflectance of the sample.

1.5 Determination of the Sears number of silicas, silicates and hydrophobic silicas 1. Application:
   Free OH groups are detectable by titration with 0.1 N KOH in the range from pH 6 to pH 9.
2. Apparatus
   2.1 Precision balance accurate to 0.01 g
   2.2 Memotitrator DL 70, Mettler, equipped with 10 ml and 20 ml burette, 1 pH electrode and 1 pump (e.g., NOUVAG pump, type SP 40/6)
   2.3 Printer
   2.4 Titration vessel 250 ml, Mettler
   2.5 Ultra-Turrax 8 000–24 000 rpm
   2.6 Thermostated waterbath
   2.7 2 dispensers 10–100 ml for metering methanol and deionized water
   2.8 1 dispenser 10–50 ml for metering deionized water
   2.9 1 measuring cylinder 100 ml
   2.10 IKA universal mill M 20.
3. Reagents
   3.1 Methanol p.A.
   3.2 Sodium chloride solution (250 g NaCl p.A. in 1 000 ml deionized water)
   3.3 0.1 N hydrochloric acid
   3.4 0.1 N potassium hydroxide solution
   3.5 Deionized water
   3.6 Buffer solutions pH 7 and pH 9.
4. Procedure
   4.1 Sample preparation
      Grind about 10 g of sample for 60 seconds in the IKA universal mill M 20.
   Important: Since only very finely ground samples give reproducible results, these conditions must be strictly observed.
   4.2 Analytical procedure
      4.2.1 Weigh out 2.50 g of the sample prepared in accordance with section 4.1 into a 250 ml titration vessel.
      4.2.2 Add 60 ml of methanol p.A.
      4.2.3 After complete wetting of the sample, add 40 ml of deionized water.
      4.2.4 Disperse for 30 seconds using the Ultra-Turrax at a speed of about 18 000 rpm.
      4.2.5 Rinse particles of sample adhering to the vessel edge and stirrer into the suspension using 100 ml of deionized water.
      4.2.6 Condition sample to 25° C. in a thermostated waterbath (for at least 20 minutes).
      4.2.7 Calibrate pH electrode with the buffer solutions pH 7 and pH 9.
      4.2.8 The sample is titrated in the Memotitrator DL 70 in accordance with method S 911. If the course of titration is indistinct, a duplicate determination is carried out subsequently.

The results printed out are as follows:

|  | pH |
|---|---|
| $V_1$ | in ml/5 g |
| $V_2$ | in ml/5 g |

5. Calculation:

$$V_1 = \frac{V*5}{E}$$

$$V_2 = \frac{V*5}{E}$$

$V_1$=ml KOH or ml HCl to pH 6/5 g of substance
$V_2$=ml KOH consumed to pH 9/5 g of substance
E=initial mass
Principle:

First of all the initial pH of the suspension is measured, then according to the result the pH is adjusted to 6 using KOH or HCl. Then 20 ml of NaCl solution are metered in. The titration is then continued to a pH of 9 using 0.1 N KOH.
Sears Numbers Si—OH+NaCl→Si—ONa+HCl HCl+KOH→KCl+H$_2$O 1.6 Determination of the tapped density in accordance with DIN/ISO 787/11
Procedure:

10 g of the sample under analysis are weighed accurately to 0.01 g on the precision balance, and are introduced into the graduated 250 ml glass cylinder of the jolting volumeter. After 1 250 jolts, the volume of the tapped material is read off.
Calculation:
Tapped Density:

$$g/l = \frac{E \cdot 1000}{I}$$

The tapped volume corresponds to the value read off.
E=initial mass in g
I=volume in ml
Apparatus:

| | |
|---|---|
| Precision balance | Engelsmann, Ludwigshafen |
| Jolting volumeter | |
| 250 ml glass cylinder, graduated | Engelsmann, Ludwigshafen |

Remarks:

In special cases, the material may be passed through a 500 μm sieve before weighing, or the initial mass may be increased. This must be specified in a test report.
1.7 Determination of CTAB surface area
1. Application The method is based on the adsorption of CTAB (N-cetyl-N,N,N-trimethylammonium bromide) on the "external" surface, which is also referred to as the "rubber-active surface".

The adsorption of CTAB takes place in aqueous solution with stirring and ultrasound treatment. Excess, unadsorbed CTAB is determined by back-titration with SDSS (dioctylsodium sulfosuccinate solution) using a titroprocessor, the endpoint being given by the maximum clouding of the solution and determined using a phototrode.

For the calculation, an occupancy of 0.35 nm$^2$ per CTAB molecule is assumed.

The determination is made in accordance with ASTM 3765.

With each measurement series, a standard sample of type VN 3 silica should be tested as well.

2. Reaction equation: (back-titration)

$R_1$—$SO_3^-$ + $^+N(CH_3)_3R_2$ ⟶ $R_1SO_3N(CH_3)_3R_2$
    SDSS                                         CTAB 3. Apparatus:
   3.1 Mill, e.g. IKA, type: M 20
   3.2 Analytical balance
   3.3 Magnetic stirrer
   3.4 Magnetic stirrer rod
   3.5 Titroprocessor, e.g., METTLER, type DL 55 or DL 70, equipped with: pH electrode, e.g., Mettler, type DG 111 phototrode, e.g. Mettler, type DP 550, and burette, 20 ml volume, for SDSS solution, burette, 10 ml volume, for 0.1 N KOH
   3.6 titration beakers, 100 ml, made of polypropylene
   3.7 glass titration vessel, 150 ml volume, closable with snap-on lid
   3.8 conical flasks, 100 ml volume, closable with screw lid or NS stopper
   3.9 ultrasound bath
   3.10 pressure filtration device
   3.11 membrane filter of cellulose nitrate, pore sizes of 0.1 μm, 47 mm Ø, e.g., Sartorius type 113 58
   3.12 pipettes, 5 ml, 100 ml
4. Reagents:
   4.1 Potassium hydroxide solution, 0.1 N
   4.2 CTAB solution, 0.0151 mol/l
      5.50 g of CTAB are dissolved with stirring (magnetic stirrer) in about 800 ml of warm (about 30–40° C.) demineralized water in a glass beaker, transferred to a 1 l graduated flask, made up to the mark with demineralized water after cooling to 23–25° C., and transferred to a stock bottle.
      Note:
      The solution must be stored and the measurement conducted at ≧23° C., since CTAB crystallizes out below this temperature. The solution should be prepared 10–14 days prior to use.
   4.3 SDSS solution 0.00426 mol/l
      1.895 g of SDSS (dioctylsodium sulfosuccinate) in a glass beaker are admixed with about 800 ml of demineralized water and the mixture is stirred with a magnetic stirrer until all of the material has dissolved. The solution is then transferred to a 1 l graduated flask, made up to the mark with demineralized water, and transferred to a stock bottle.
      SDSS solution readily undergoes biodegradation. The solution prepared should therefore be sealed well and should not be stored for more than 3 months.
      The concentration of the CTAB solution is assumed to be exact: 0.0151 mol/l.
      The concentration of the SDSS solution should be determined daily by means of a "blank" titration.
5. Procedure:
   5.1 Blank titration (to determine the concentration of the SDSS solution).
   5.1.2 The consumption of SDSS solution for 5 ml of CTAB solution should be checked (blank value) 1× per day before each series of measurements.
   5.1.3 Pipette precisely 5 ml of CTAB solution into titration beakers.
   5.1.4 Add about 50 ml of demineralized water.

5.1.5 Titrate with the titroprocessor until the end of titration. Each blank titration should be performed as a duplicate determination; in the case where values do not agree, further titrations should be carried out until the results are reproducible.

5.2 Adsorption 5.2.1 The granulated and coarse samples are ground in a mill (the beater blade of the mill must be covered).

5.2.2 Weigh out exactly 500 mg of the ground sample on the analytical balance to a precision of 0.1 mg.

5.2.3 Transfer the sample amount weighed out quantitatively to a 150 ml titration vessel with magnetic stirrer rod.

5.2.4 Add exactly 100 ml of CTAB solution, seal titration vessel with lid, and stir on a magnetic stirrer for 15 minutes.

5.2.5 Screw the titration vessel onto the titroprocessor and adjust the pH of the suspension to ±0.05 using KOH, 0.1 mol/l.

5.2.6 4-minute treatment of the suspension in the ultrasound bath.

5.2.7 Filtration through a pressure filter fitted with a membrane filter. During adsorption, it must be ensured that the temperature is held within the range from 23° C. to 25° C.

5.3 Titration 5.3.1 Pipette 5 ml of filtrate (see section 5.2.7) into 100 ml titration beakers and make up to about 50 ml with demineralized water.

5.3.2 Screw titration beakers onto the titrator.

5.3.3 Carry out titration with SDSS solution in accordance with the defined measurement method, until clouding reaches a maximum. Each titration should be performed as a duplicate determination; in the case where values do not agree, further titration should be carried out until the results are reproducible.

6. Calculation $$m^2/g = (V_1 - V_2) * \frac{100 * E * 2 * 578.435}{V_1 * 1000}$$

$$m^2/g = (V_1 + V_2) * \frac{115.687 * E}{V_1}$$

$$M^2/g = (V_1 + V_2) * \frac{115.687}{V^1} * 5.5$$

$V_1$=blank sample (ml of SDSS when using 5 ml of CTAB)
$V_2$=consumption (ml of SDSS when using 5 ml of filtrate)
E=initial mass g CTAB/l (5.5 g)
578.435=occupancy of 1 g of CTAB in m².

The measured value is normally to be given corrected to the anhydrous substance:

$$m^2/g = \frac{CTAB m^2/g * 100}{100 - \% H_2O}$$

Where the measured value for the standard sample differs by more than ±3 m²/g from the theoretical value, the entire measurement series must be repeated.

7. Notes re 1. In the literature, SDSS (dioctylsodium sulfosuccinate) is also called Aerosol OT.
   On samples with a pH>9, such as Extrusil, the pH is measured but not corrected, since the acid may alter the surface.

Prior to beginning the titration, the phototrode is set to 1 000 mV, corresponding to a transparency of 100%.

re 3. For measuring the different prescribed volumes of the CTAB solution, it is also possible to use dispensers or piston-stroke pipettes, provided they are regularly calibrated.

re 4. The solutions indicated in sections 4.1 and 4.3 can also be purchased as ready-to-use solutions. The present supplier is Kraft, Duisburg. Telephone: 0203–58–3025.
   Order No. 6056.4 CTAb solution 0.0151 ml/l
   Order No. 6057.4 SDSS solution 0.00423 mol/l (in 2.5-liter glass bottles)

re 5.2.4 Hydrophobic samples which are not wetted after stirring are dispersed carefully using an ULTRA-TURRAX before the pH is adjusted, in order to wet them.

re 5.2.5 For adjusting the pH it is advisable to use a titrator. The titration is carried out in accordance with the end-point method.

re 5.2.7 For filtration, nitrogen from a compressed gas bottle is used; an admission pressure of 4–6 bar is to be set.

re 6. Should it be necessary to repeat a measurement series, it should be noted in particular that the pH meter used to set the pH must also be recalibrated.

1.8 Determination of water vapor absorption (water vapor isotherms)

To determine the water vapor absorption, the sample is exposed to different relative humidities at constant temperature (30° C.). The establishment of a constant weight is awaited.

To start with, completely dry air (i.e., air humidity approximately zero) is used. After the equilibrium weight has been reached, this weight is chosen as the reference point; in other words, the water vapor absorption at a higher air humidity is expressed as the difference between the sample weight in completely dry air (following establishment of equilibrium) and the sample weight in humid air (following establishment of equilibrium). The air humidity is varied in steps of 10%.

In order to rule out hysteresis effects, both the water adsorption and the water vapor desorption are measured.

Example 1

The drying and coating of the base silica with silicone oil (DOW CORNING (R) 200 FLUID 50 CS, carbon content approximately 33%, viscosity of 50 mPas·sec) were carried out using a spin-flash drier. The silica was then conditioned at room temperature for at least 48 hours until it had a methanol wettability of at least 20%. The analytical data of the conditioned silica are given in Table 1.1.

TABLE 1.1

Analytical data of the conditioned silica

| | | |
|---|---|---|
| Water | % | 5.2 |
| pH | | 6.1 |
| Conductivity | µS | 41 |
| $N_2$ surface area | m²/g | 84 |
| CTAB surface area | m²/g | 132 |
| Tapped density | g/L | 317 |
| Reflectance | % | 95.9 |
| C content | % | 4.12 |
| Methanol wettability | % | >20 |

Heat treatment was then carried out at different oxygen contents in a fluidized bed. The experimental parameters are given in Table 1.2.

TABLE 1.2

Heat treatment in a fluidized bed at varying oxygen content:

|  | Exp. 1 | Exp. 2 | Exp. 3 |
|---|---|---|---|
| Heat treatment time [min] | 60 | 60 | 60 |
| Product temperature [° C.] | 320–380 | 320–380 | 320–380 |
| Oxygen content [%] | 0–0.001 | 4.0–6.0 | 20–22 |
| C content prior to heat treatment | 4.12 | 4.12 | 4.12 |

The experiments show the connection between oxygen content and discoloration. Only in the case of experiments 2 and 3 a reflectance >94% was achieved. In contrast to the silica from experiment 1, these silicas showed no visible discoloration in the silicone rubber. The analytical data of the oxidatively heat-treated precipitated silica are given in Table 1.3.

TABLE 1.3

Analysis:

|  | Exp. 1 | Exp. 2 | Exp. 3 |
|---|---|---|---|
| MeOH wettability | 63 | 63 | 63 |
| C content after heat treatment | 3.96 | 3.47 | 3.39 |
| Reflectance | 92.8 | 94.5 | 94.9 |

Example 2

The base silica was coated with silicone oil (dimethylpolysiloxane, 50 mPas·sec, e.g., DOW CORNING (R) 200 FLUID 50 CS, carbon content approximately 33%) in a Gericke mixer in a mass ratio of 1:1. The resulting powder was conditioned for an hour at a temperature of 105° C. This produced a material in which, although it was wettable by water, the silica and silicone oil could no longer be separated from one another in water. Mixing of this masterbatch with filtercakes of the base silica produced stable formulations in which the silicone oil no longer separated from the hydrophilic filtercake. A hydrophobic masterbatch thus prepared and filtercakes were conveyed together into the spin-flash drier, in which they were mixed and dried. The dimethylsiloxane-treated silica was conditioned by aging at room temperature for 3 days until it had attained a methanol wettability of at least 20%. The analytical data of the conditioned silica are given in Table 2.1.

TABLE 2.1

Analytical data of the conditioned silica

| Water | % | 3.4 |
|---|---|---|
| pH |  | 6.3 |
| Conductivity | µS | 100 |
| $N_2$ surface area | $m^2/g$ | 74 |
| CTAB surface area | $m^2/g$ | 119 |
| DBP absorption | g/100 g | 198 |
| Tapped density | g/L | 323 |
| Reflectance | % | 95.9 |
| C content | % | 5.03 |
| Methanol wettability | % | >20 |

The conditioned precipitated silica was heat-treated under oxidizing conditions in a muffle furnace with a bed height of about 1 to 2 cm at a temperature above 330–360° C. for 1 h. The analytical data of the oxidatively heat-treated precipitated silica are given in Table 2.3:

TABLE 2.3

Product data, oxidatively heat-treated material

| $N_2$ surface area | $m^2/g$ | 96 |
|---|---|---|
| CTAB surface area | $m^2/g$ | 41 |
| Reflectance | % | 94.5 |
| C content | % | 3.93 |
| Methanol wettability | Approx. % | 67 |

Example 3

The initial distribution of silicone oil (viscosity of 50 m·Pas-sec, methyl-terminated, e.g., DOW CORNING (R) 200 FLUID 50 CS, carbon content approximately 33%) on the silica (in the form of filtercakes) took place in a spin-flash drier, with simultaneous drying. The dimethylsiloxane-treated silica was conditioned at room temperature for at least 48 hours until it had attained a methanol wettability of at least 20%. The analytical data of the conditioned silica are given in Table 3.1.

TABLE 3.1

Analytical data of the conditioned silica

| Water | % | 5.2 |
|---|---|---|
| pH |  | 6.1 |
| Conductivity | µS | 41 |
| $N_2$ surface area | $m^2/g$ | 84 |
| CTAB surface area | $m^2/g$ | 132 |
| Tapped density | g/L | 317 |
| Reflectance | % | 95.9 |
| C content | % | 4.12 |
| Methanol wettability | % | >20 |

The material was heat-treated under oxidizing conditions in a muffle furnace with a bed height of about 1 to 2 cm at a temperature above 330–360° C. for 1 h. The analytical data of the oxidatively heat-treated precipitated silica are given in Table 3.2.

TABLE 3.2

Product data, oxidatively heat-treated material

| $N_2$ surface area | $m^2/g$ | 102 |
|---|---|---|
| Reflectance | % | 94.7 |
| C content | % | 3.59 |
| Methanol wettability | approx. % | 67 |

Example 4

The base silica was coated in a mass ratio of 1:1 with silicone oil (dimethylpolysiloxane, 50 mPas·sec, e.g., DOW CORNING (R) 200 FLUID 50 CS carbon content approximately 33%) in a Gericke mixer. The resulting powder was conditioned for at least one hour at a temperature of 105° C. This produced a material in which, although it was wettable by water, the silica and silicone oil could no longer be separated from one another with water. Mixing of this masterbatch in water produced stable suspensions in which the silicone oil could no longer be separated from the silica. The analytical data of the suspension are given in Table 4.1.

TABLE 4.1

| Suspension data | | |
|---|---|---|
| Solids content | % | 12.8 |
| pH | | 5.2 |
| Conductivity | µS | 382 |
| Viscosity | mPas | 183 |

The suspension was dried using a spray drier. The dimethylsiloxane-treated silica is conditioned by aging at room temperature for at least 48 hours until it had attained a methanol wettability of at least 20%. The analytical data of the conditioned silica are given in Table 4.2.

TABLE 4.2

| Analytical data of the conditioned silica | | |
|---|---|---|
| Loss on ignition | % | 12.4 |
| Water | % | 2.2 |
| pH | | 6.4 |
| Conductivity | µS | 135 |
| $N_2$ surface area | $m^2/g$ | 80 |
| CTAB surface area | $m^2/g$ | 131 |
| DBP absorption | g/100 g | 236 |
| Tapped density | g/L | 256 |
| Reflectance | % | 94.5 |
| C content | % | 4.21 |
| Methanol wettability | % | >20% |

The conditioned precipitated silica was heat-treated under oxidizing conditions in a muffle furnace with a bed height of about 1 to 2 cm at a temperature above 330–360° C. for 1 h. The analytical data of the oxidatively heat-treated precipitated silica are given in Table 4.3.

TABLE 4.3

| Product data, oxidatively heat-treated | | |
|---|---|---|
| Water | % | 0.6 |
| $N_2$ surface area | $m^2/g$ | 91 |
| CTAB surface area | $m^2/g$ | 52 |
| Reflectance | % | 94.3 |
| C content | % | 4.01 |
| Methanol wettability | approx. % | 66 |

Example 5

Silicone oil (polydimethylsiloxane, 50 mPas·sec, e.g., DOW CORNING (R) 200 FLUID 50 CS, carbon content approximately 33%) was suspended in a suspension of the base silica (solids content 12.8%) using a high-shear mixer. The distribution of the silicone oil in the silica suspension was conserved by immediate spray drying. The dimethylsiloxane-treated silica was conditioned by aging at room temperature for at least 48 hours until it has attained a methanol wettability of at least 20%. The analytical data of the conditioned silica are given in Table 5.1.

TABLE 5.1

| Analytical data of the conditioned silica | | |
|---|---|---|
| Loss on ignition | % | 13.0 |
| Water | % | 2.2 |
| pH | | 5.5 |
| Conductivity | µS | 100 |
| $N_2$ surface area | $m^2/g$ | 85 |

TABLE 5.1-continued

| Analytical data of the conditioned silica | | |
|---|---|---|
| CTAB surface area | $m^2/g$ | 137 |
| DBP absorption | g/100 g | 253 |
| Tapped density | g/L | 270 |
| Reflectance | % | 94.2 |
| C content | % | 4.78 |
| Methanol wettability | % | >20% |

The material was heat-treated under oxidizing conditions in a muffle furnace with a bed height of about 1 to 2 cm at a temperature above 330–360° C. for 1 h. The analytical data of the oxidatively heat-treated precipitated silica are given in Table 5.2.

TABLE 5.2

| Product data, oxidatively heat treated | | |
|---|---|---|
| Water | % | 1.6 |
| $N_2$ surface area | $m^2/g$ | 102 |
| CTAB surface area | $m^2/g$ | 43 |
| Reflectance | % | 94.2 |
| C content | % | 3.44 |
| Methanol wettability | Approx. % | 65 |

Example 6

The hydrophobic base silica was coated dry with silicone oil (polydimethylsiloxane, viscosity 50 mPas·sec, e.g., DOW CORNING (R) 200 FLUID 50 CS, carbon content approximately 33%) and conditioned by aging at room temperature for at least 48 hours until it had attained a methanol wettability of at least 20%. The material was heat treated under oxidizing conditions at a temperature above 330–360° C. for 1 h. The analytical data of the resulting material are given in Table 6.1.

TABLE 6.1

| Product data, oxidatively heat treated | | |
|---|---|---|
| Water | % | 1.1 |
| Loss on ignition | | 4.3 |
| $N_2$ surface area | $m^2/g$ | 89 |
| pH | | 7.9 |
| Conductivity | µS | 40 |
| DBP | % | 189 |
| C content | % | 3.9 |
| Reflectance | % | 95 |
| Methanol wettability | % | 67 |

Example 7

A hydrophobic precipitated silica having the properties according to Table 1 was prepared and was incorporated into an RTV 1C silicone rubber mixture according to Table 2. Table 3 shows the rheological behavior of this RTV 1C silicone sealing compound with different levels of silica filling. The standard silicas used were pyrogenic silicas of types AEROSIL 150 (hydrophilic) and AEROSIL R 974 and AEROSIL R 972 (hydrophobic). The Table shows a marked increase in viscosity as the level of filling with hydrophobic precipitated silica goes up, so that the rheology level of a standard formulation with AEROSIL 150 was achieved from a level of filling of about 17% by weight.

TABLE 1

Physicochemical data of the hydrophobic precipitated silica used

| Loss on ignition [%] | Loss on drying [%] | pH | BET surface area [m²/g] | CTAB surface area [m²/g] | DBP absorption [g/100 g] | Tapped density [g/l] | Average particle size [μm] | Methanol wettability [%] | Carbon content [%] |
|---|---|---|---|---|---|---|---|---|---|
| 9 | 1 | 8.1 | 79 | 48 | 163 | 143 | 11.9 | 68 | 5.09 |

TABLE 2

| | |
|---|---|
| 62.4% silicone polymer | OH terminated, e.g., M 50 from GEBS |
| 24.6% silicone oil | Unfunctionalized, e.g., M 1000 from GEBS Composition: α,ω-trimethylsiloxypolydimethylsiloxane |
| 3.99% crosslinker | e.g., Silopren crosslinker 3034 from GEBS Composition: ethyltriacetoxysilane |
| 1.0% adhesion promoter | e.g., Silopren adhesion promoter 3001 from GEBS Composition: di-tert-butoxydiacetoxysilane |
| 0.01% catalyst | e.g., Silopren catalyst DBTA from GEBS Composition: dibutyltin diacetate |
| 8.0% silica | Hydrophobic precipitated silica or blends with hydrophilic pyrogenic silica (e.g., AEROSIL 300 Degussa AG) or hydrophobic pyrogenic silica (e.g., AEROSIL R 812 S Degussa AG) |

GEBS: GE Bayer Silicones

TABLE 3

Rheological properties of the RTV 1C formulations

| Test No. | Filling level [% by weight] | Yield point [Pa] | Viscosity [Pa * s] |
|---|---|---|---|
| 513 | Silica as per Table 1 [8%] | 0 | 28 |
| 530 | Silica as per Table 1 [15%] | 2 | 59 |
| 547 | Silica as per Table 1 [17%] | 10 | 102 |
| 518 | Silica as per Table 1 [20%] | 75 | 310 |
| 474 | AEROSIL 150 [8%] | 398 | 147 |
| 484 | AEROSIL R 974 [8%] | 357 | 142 |
| 388 | AEROSIL R 972 [8%] | 184 | 114 |

Table 4 shows the corresponding mechanical properties of the RTV 1C vulcanizates. The mechanical properties of the formulations of the invention are, at the same viscosity, considerably better than those of the known formulation.

TABLE 4

Mechanical properties of the RTV 1C formulations (vulcanizates)

| Test No. | Filling level [% by weight] | Tensile strength [N/mm²] | Elongation at break [%] | Tear resistance [N/mm] | Shore A hardness |
|---|---|---|---|---|---|
| 513 | Silica as per Table 1 [8%] | 0.7 | 682 | 1.6 | 9 |
| 530 | Silica as per Table 1 [15%] | 2.2 | 1 299 | 3.5 | 13 |
| 547 | Silica as per Table 1 [17%] | 2.6 | 1 217 | 3.5 | 16 |
| 518 | Silica as per Table 1 [20%] | 4.1 | 1 342 | 5.4 | 21 |
| 474 | AEROSIL 150 [8%] | 1.4 | 515 | 2.5 | 20 |
| 484 | AEROSIL R 974 [8%] | 1.3 | 445 | 2.1 | 22 |
| 388 | AEROSIL R 972 [8%] | 1.1 | 557 | 3.0 | 16 |

Tables 5 and 6 show that the formulations of the invention are still storable even after 30 days.

TABLE 5

Viscosity changes over time at room temperature

| | | Viscosity [Pa · s] | | | Yield point [Pa] | | |
|---|---|---|---|---|---|---|---|
| Test No. | Filling level [%] | directly after incorporation | After 7 days | After 30 days | directly after incorporation | After 7 days | After 30 days |
| 513 | 8 | 28 | 28 | 28 | 0 | 0 | 0 |
| 530 | 15 | 59 | 66 | 64 | 1.9 | 3.0 | 3.2 |
| 547 | 17 | 102 | 104 | — | 10 | 10 | — |
| 518 | 20 | 310 | *n.a. | — | 75 | — | — |

*Silicone formulation no longer removable from tube owing to excessive viscosity

TABLE 6

Viscosity changes over time at 60° C.

| | | Viscosity [Pa · s] | | | Yield point [Pa] | | |
|---|---|---|---|---|---|---|---|
| Test No. | Filling level [%] | directly after incorporation | After 7 days | After 30 days | directly after incorporation | After 7 days | After 30 days |
| 513 | 8 | 28 | 17 | 15 | 0 | 0 | 0 |
| 530 | 15 | 59 | 49 | 48 | 1.9 | 2.3 | 2.5 |

A temperature increase of 60° C. simulated a storage time of approximately 6 months. Here again, no significant changes in rheological properties were found.

Example 8

Figure 3:
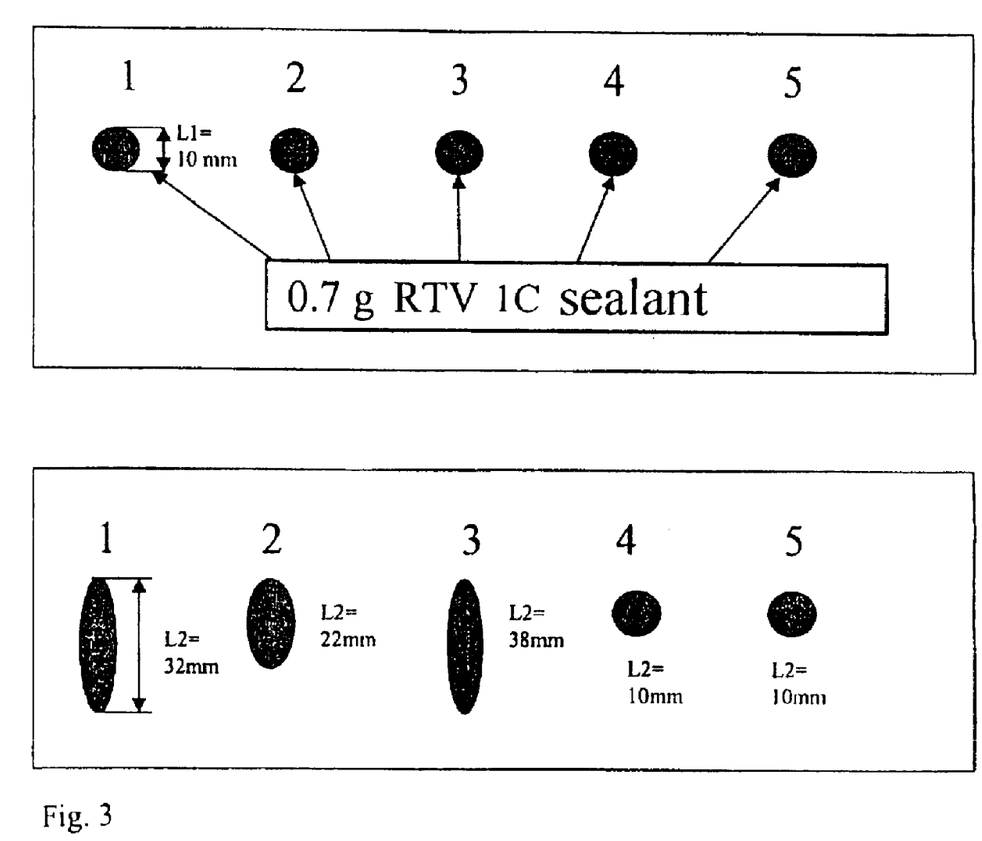
FIG. 3 shows the flow behavior of a mixture containing a hydrophobic precipitated silica according to Example 8.

The yield point of RTV 1C silicone rubber formulations comprising hydrophobic precipitated silica and, optionally, pyrogenic silica was investigated. In order to determine the flow behavior, the corresponding mixtures were prepared and an amount of 0.7 g was applied to a glass plate. The glass plate was then stood vertically and the flow behavior was determined 24 hours later by measuring the length of flow. It was found that the flow behavior of a mixture containing a hydrophobic precipitated silica can be improved considerably by adding a small amount of pyrogenic silicas (FIG. 3). Table 7 shows the thixotropic behavior or stability of such mixtures.

It can therefore be stated that by adding pyrogenic silicas the flow behavior of the silicone rubber formulations of the invention can be adjusted within wide limits irrespective of the level of filling with hydrophobic silica.

TABLE 7

Thixotropic behavior of blends of hydrophobic precipitated silica and hydrophilic pyrogenic silica

| Experiment | Silicas Level of filling [%] | Yield point [Pa] | Viscosity [Pa * s] | Result (L2-L1) |
|---|---|---|---|---|
| 1 | Hydrophobic silica as per Table 1 [15%] | 2 | 59 | fluid (22 mm) |
| 2 | Hydrophobic silica as per Table 1 [17%] | 10 | 102 | fluid (10 mm) |
| 3 | Hydrophobic silica as per Table 1 [10%] plus Aerosil 300 [1%] | 1 | 61 | fluid (28 mm) |
| 4 | Hydrophobic silica as per Table 1 [10%] plus Aerosil 300 [2%] | 21 | 93 | nonfluid (0 mm) |
| 5 | Aerosil 150 [8%] | 398 | 147 | nonfluid (0 mm) |

L1 = the length of the material before the flowing test.
L2 = the length of the material after the flowing test.

German patent application 10203500.8 filed Jan. 30, 2001, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A room temperature crosslinking, one component silicone rubber formulation, comprising:

A) 0.5 to 60% by weight of a hydrophobic silica having the following properties:

a carbon content of >3.1%;

a methanol wettability of >60%;

a reflectance of >94%;

a BET/CTAB ratio of from >1 to <3;

a DBP absorption of <230 g/100 g;

a BET surface area of from 50 to 110 m$^2$/g;

a CTAB surface area of >30 m$^2$/g;

a water vapor absorption at 30° C. at an ambient humidity of 30 of <1.3;

a water vapor absorption at 30° C. at an ambient humidity of 70 of <1.7; and

B) 40–99.5% by weight of an organopolysiloxane of the formula $$ZnSiR_3\text{-}n\text{-}O\text{—}[SiR_2O]_x\text{—}SiR_{3\text{-}n}\text{—}Z'_n$$

wherein each R represents independently alkyl, acetoxy, oxime, alkoxy, amido, aryl or alkenyl radicals, each having from 1 to 50 carbon atoms, each unsubstituted or substituted identically or differently by O, S, F, Cl, Br or I; or R represents independently polystyrene, polyvinyl acetate, polyacrylate, polymethacrylate, or polyacrylonitrile radicals, each having 50–10 000 repeating units;

wherein each Z represents independently OH, Cl, Br, acetoxy, amino, amido, amineoxy, oxime, alkoxy, alkenyloxy, acyloxy or phosphate radicals, wherein said acetoxy, amino, amido, amineoxy, oxime, alkoxy, alkenyloxy and acyloxy radicals each have up to 20 carbon atoms;

wherein each Z' represents independently oxime, alkoxy, amido or acetoxy radicals;

wherein n is 1–3; and wherein x is 100–15 000.

2. The silicone rubber formulation as claimed in claim 1, wherein the hydrophobic silica is obtained from precipitated silica; and wherein said silicone rubber formulation comprises 0.01–12% by weight of pyrogenic silica.

3. The silicone rubber formulation as claimed in claim 1, further comprising from 0.01 to 99.5% by weight of an unfunctionalized polysiloxane.

4. The silicone rubber formulation as claimed in claim 1, further comprising 0.1 20% by weight of one or more water-binding agents.

5. The silicone rubber formulation as claimed in claim 1, wherein the organopolysiloxane has a viscosity of not more than 500000 cP.

6. The silicone rubber formulation as claimed in claim 1, wherein the hydrophobic silica has a modified Sears number <1.6.

7. The silicone rubber formulation as claimed in claim 1, wherein the hydrophobic silica has a pH of from 5.0 to 9.0.

8. The silicone rubber formulation as claimed in claim 1, wherein the hydrophobic silica has a water content of <2%.

9. The silicone rubber formulation as claimed in claim 1, wherein the hydrophobic silica has a conductivity of <500 µS.

10. The silicone rubber formulation as claimed in claim 1, wherein the hydrophobic silica has a loss on ignition of >3%.

11. The silicone rubber formulation as claimed in claim 1, wherein the hydrophobic silica is a hydrophobic precipitated silica.

12. The silicone rubber formulation as claimed in claim 1, further comprising a) from 0.01 to 6% by weight of a1) an organic compound or a2) an inorganic compound of Pt, Sn, Ti, Zn or a mixture thereof or a3) a combination of a1) and a2) as catalyst;

b) from 0.01 to 6% by weight of an inhibitor;

c) from 0.01 to 6% by weight of an adhesion promoter;

d) from 0.01 to 6% by weight of a fungicide, a bactericide or both; or e) a combination of at least two of a)–d).

13. A silicone sealing compound comprising the silicone rubber formulation according to claim 1.

14. The silicone sealing compound according to claim 13 which is a self-leveling silicone sealing compound.

15. A composition comprising the silicone rubber formulation as claimed in claim 1 in a cured form.

16. A cured composition obtained by contacting the silicone rubber formulation as claimed in claim 1 with moisture.

17. The silicone rubber formulation as claimed in claim 1, further comprising from 0.5 to 20% by weight of a crosslinker having the formula $$R'_{4\text{-}t}SiZ'_t$$

wherein each R' represents independently alkyl, alkoxy, acetoxy, amido, oxime, aryl or alkenyl radicals, each having from 1 to 50 carbon atoms, each unsubstituted or substituted identically or differently by O, S, F, Cl, Br or I; or R' represents independently polystyrene, polyvinyl acetate, polyacrylate, polymethacrylate or polyacrylonitrile radicals, each having 5–5 000 repeating units;

wherein each Z' represents independently OH, Cl, Br, acetoxy, oxime, acryloxy, amido, amineoxy, alkenyloxy, acyloxy or phosphate radicals, wherein said acetoxy, amino, amido, amineoxy, oxime, alkoxy, alkenyloxy and acyloxy radicals each have up to 20 carbon atoms; and wherein t is 3 or 4.

18. The composition as claimed in claim 17, wherein the composition is cured and cross-linked.

19. A cured and cross-linked composition obtained by heating and contacting the silicone rubber formulation as claimed in claim 17 with moisture.

* * * * *